United States Patent
Wasa et al.

(10) Patent No.: US 12,338,306 B2
(45) Date of Patent: Jun. 24, 2025

(54) OPTICAL COMPONENT

(71) Applicant: MITSUI CHEMICALS, INC., Tokyo (JP)

(72) Inventors: Hideki Wasa, Chiba (JP); Futoshi Fujimura, Ichihara (JP); Haruka Saito, Chiba (JP); Tatsuya Nakamura, Ichihara (JP); Makoto Nakashima, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 456 days.

(21) Appl. No.: 17/789,443

(22) PCT Filed: Dec. 14, 2020

(86) PCT No.: PCT/JP2020/046598
§ 371 (c)(1),
(2) Date: Jun. 27, 2022

(87) PCT Pub. No.: WO2021/149400
PCT Pub. Date: Jul. 29, 2021

(65) Prior Publication Data
US 2023/0087005 A1    Mar. 23, 2023

(30) Foreign Application Priority Data
Jan. 22, 2020 (JP) ................... 2020-008687

(51) Int. Cl.
| | |
|---|---|
| C08F 210/02 | (2006.01) |
| C08F 232/04 | (2006.01) |
| C08F 232/08 | (2006.01) |
| G02B 1/04 | (2006.01) |

(52) U.S. Cl.
CPC .......... C08F 232/04 (2013.01); C08F 210/02 (2013.01); G02B 1/041 (2013.01); C08F 232/08 (2013.01)

(58) Field of Classification Search
CPC ............... C08F 210/02; C08F 232/08
See application file for complete search history.

(56) References Cited

U.S. PATENT DOCUMENTS

| | | | | |
|---|---|---|---|---|
| 4,614,778 A | * | 9/1986 | Kajiura | ............ C08G 61/08 526/169.2 |
| 4,948,856 A | | 8/1990 | Minchak et al. | |
| 2020/0369812 A1 | * | 11/2020 | Wasa | ............ B65D 85/70 |

FOREIGN PATENT DOCUMENTS

| | | |
|---|---|---|
| JP | S61115916 A | 6/1986 |
| JP | S64054011 A | 3/1989 |
| JP | H03205410 A | 9/1991 |
| JP | H05310845 A * | 11/1993 |
| JP | 2005089743 A | 4/2005 |
| JP | 2015199939 A | 11/2015 |
| WO | WO-2019107363 A1 * | 6/2019 ................ A61J 1/05 |

* cited by examiner

*Primary Examiner* — Richard A. Huhn
(74) *Attorney, Agent, or Firm* — BUCHANAN INGERSOLL & ROONEY PC

(57) ABSTRACT

Provided is an optical component including a cyclic olefin-based copolymer (A), in which the cyclic olefin-based copolymer (A) has a constitutional unit (a) derived from at least one olefin represented by the following general formula (I), a constitutional unit (b) derived from at least one cyclic olefin represented by the following general formula (II), and a constitutional unit (c) derived from at least one cyclic olefin represented by the following general formula (III), and the content of the constitutional unit (a) is equal to or less than 50 mol % in a case where the total content of the constitutional unit (a), the constitutional unit (b), and the constitutional unit (c) is taken as 100 mol %.

6 Claims, No Drawings

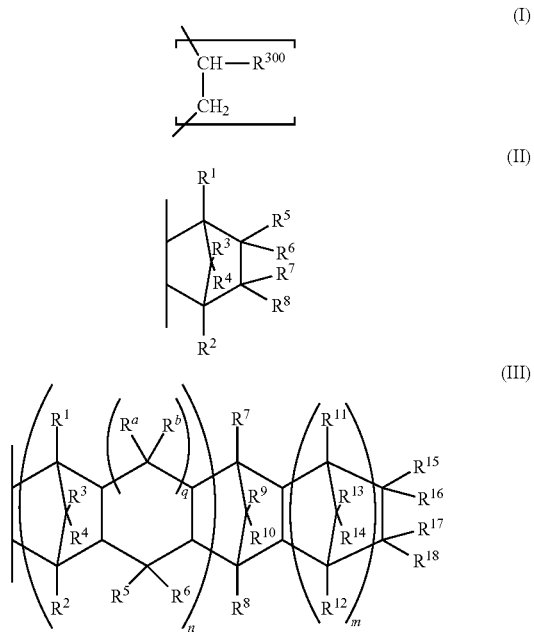

OPTICAL COMPONENT

TECHNICAL FIELD

The present invention relates to an optical component.

BACKGROUND ART

A cyclic olefin-based copolymer has excellent optical performance and is therefore used, for example, as an optical component such as an optical lens.

Examples of the technique relating to the cyclic olefin-based copolymer used for the optical component include that described in Patent Document 1 (Japanese Unexamined Patent Publication No. 2015-199939).

Patent Document 1 discloses a cyclic olefin-based resin composition including a cyclic olefin-based copolymer and a diglycerin fatty acid ester. Patent Document 1 describes that a molded product having excellent optical performance and suppressing deterioration of optical performance under high temperature and high humidity conditions can be obtained in a case where such a cyclic olefin-based resin composition is used.

RELATED DOCUMENT

Patent Document

[Patent Document 1] Japanese Unexamined Patent Publication No. 2015-199939

SUMMARY OF THE INVENTION

Technical Problem

In recent years, there has been an increasing demand for an in-vehicle camera lens and a camera lens for a mobile device (a mobile phone, a smartphone, a tablet, or the like). High heat resistance is required for the in-vehicle camera lens and the camera lens for a mobile device. The cyclic olefin-based copolymer is widely used in an optical component such as a camera lens because of its excellent optical properties and mechanical properties.

However, according to the studies by the present inventors, it has been found that an optical component including a cyclic olefin-based copolymer may undergo a change in refractive index and therefore deterioration of optical performance upon exposure to a high temperature environment for a long period of time.

The present invention has been made in view of the above circumstances, and provides an optical component having a high refractive index and excellent long-term reliability of optical performance in a high temperature environment.

Solution to Problem

According to the present invention, an optical component shown below is provided.

[1]

An optical component including a cyclic olefin-based copolymer (A), in which the cyclic olefin-based copolymer (A) has
a constitutional unit (a) derived from at least one olefin represented by the following general formula (I),
a constitutional unit (b) derived from at least one cyclic olefin represented by the following general formula (II), and
a constitutional unit (c) derived from at least one cyclic olefin represented by the following general formula (III), and
a content of the constitutional unit (a) is equal to or less than 50 mol % in a case where a total content of the constitutional unit (a), the constitutional unit (b), and the constitutional unit (c) is taken as 100 mol %.

[Chem. 1]

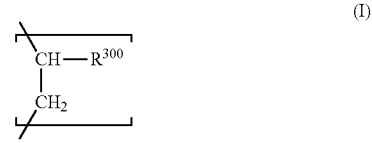

(In the above general formula (I), $R^{300}$ represents a hydrogen atom or a linear or branched hydrocarbon group having 1 to 29 carbon atoms.)

[Chem. 2]

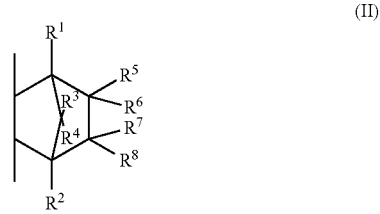

(In the above general formula (II), $R^1$ to $R^8$ are each independently a hydrogen atom, a halogen atom, or a hydrocarbon group having equal to or less than 4 carbon atoms, $R^5$ to $R^8$ may be bonded to each other to form a monocyclic ring, the monocyclic ring may have a double bond, and $R^5$ and $R^6$ or $R^7$ and $R^8$ may form an alkylidene group.)

[Chem. 3]

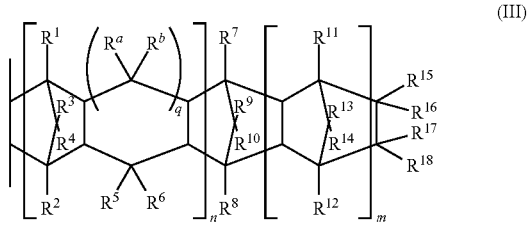

(In the above general formula (III), n is 0 or 1, m is 0 or a positive integer, n+m is a positive integer, q is 0 or 1, $R^1$ to $R^{18}$ and $R^a$ and $R^b$ are each independently a hydrogen atom, a halogen atom, or a hydrocarbon group, $R^{15}$ to $R^{18}$ may be bonded to each other to form a monocyclic or polycyclic ring, the monocyclic or polycyclic ring may have a double bond, and $R^{15}$ and $R^{16}$ or $R^{17}$ and $R^{18}$ may form an alkylidene group.)

[2]

The optical component according to [1],
in which a glass transition point (Tg) of the cyclic olefin-based copolymer (A) measured by DSC is equal to or higher than 140° C.

[3]

The optical component according to [1] or [2], in which a ratio ((b)/(c)) of a content of the constitutional unit (b) to a content of the constitutional unit (c) in the cyclic olefin-based copolymer (A) is equal to or more than 2.

[4]

The optical component according to any one of [1] to [3], in which the constitutional unit (b) in the cyclic olefin-based copolymer (A) includes a repeating unit derived from bicyclo[2.2.1]-2-heptene, and the constitutional unit (c) in the cyclic olefin-based copolymer (A) includes a repeating unit derived from tetracyclo [$4.4.0.1^{2,5}.1^{7,10}$]-3-dodecene.

[5]

The optical component according to any one of [1] to [4], in which the constitutional unit (a) in the cyclic olefin-based copolymer (A) includes a repeating unit derived from ethylene.

[6]

The optical component according to any one of [1] to [5], in which the optical component is an fθ lens, an image pickup lens, a sensor lens, a prism, or a light guide plate.

[7]

The optical component according to any one of [1] to [6], in which the optical component is an in-vehicle camera lens or a camera lens for a mobile device.

Advantageous Effects of Invention

According to the present invention, it is possible to provide an optical component having a high refractive index and excellent long-term reliability of optical performance in a high temperature environment.

DESCRIPTION OF EMBODIMENTS

Hereinafter, the present invention will be described based on the embodiments. In the present embodiment, "A to B" indicating a numerical range represent equal to or more than A and equal to or less than B unless otherwise specified.

Optical Component

First, an optical component of the embodiment according to the present invention will be described.

The optical component according to the present embodiment is an optical component including a cyclic olefin-based copolymer (A), in which the cyclic olefin-based copolymer (A) has a constitutional unit (a) derived from at least one olefin represented by the following general formula (I), a constitutional unit (b) derived from at least one cyclic olefin represented by the following general formula (II), and a constitutional unit (c) derived from at least one cyclic olefin represented by the following general formula (III), and the content of the constitutional unit (a) is equal to or less than 50 mol % in a case where the total content of the constitutional unit (a), the constitutional unit (b), and the constitutional unit (c) is taken as 100 mol %.

[Chem. 4]

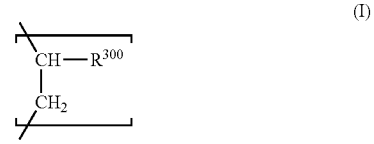

(In the above general formula (I), $R^{300}$ represents a hydrogen atom or a linear or branched hydrocarbon group having 1 to 29 carbon atoms.)

[Chem. 5]

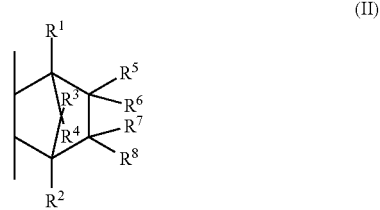

(In the above general formula (II), $R^1$ to $R^8$ are each independently a hydrogen atom, a halogen atom, or a hydrocarbon group having equal to or less than 4 carbon atoms, $R^5$ to $R^8$ may be bonded to each other to form a monocyclic ring, the monocyclic ring may have a double bond, and $R^5$ and $R^6$ or $R^7$ and $R^8$ may form an alkylidene group.)

[Chem. 6]

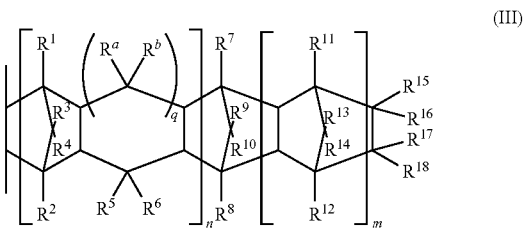

(In the above general formula (III), n is 0 or 1, m is 0 or a positive integer, n+m is a positive integer, q is 0 or 1, $R^1$ to $R^{18}$ and $R^a$ and $R^b$ are each independently a hydrogen atom, a halogen atom, or a hydrocarbon group, $R^{15}$ to $R^{18}$ may be bonded to each other to form a monocyclic or polycyclic ring, the monocyclic or polycyclic ring may have a double bond, and $R^{15}$ and $R^{16}$ or $R^{17}$ and $R^{18}$ may form an alkylidene group.)

According to the studies by the present inventors, it has been found that an optical component including a cyclic olefin-based copolymer undergoes a change in refractive index and therefore deterioration of optical performance upon exposure to a high temperature environment for a long period of time.

The present inventors have conducted extensive studies to solve the above problem. As a result, it has been found that an optical component using the cyclic olefin-based copolymer (A) having the constitutional unit (a) derived from at least one olefin represented by the above general formula (I), the constitutional unit (b) derived from at least one cyclic olefin represented by the above general formula (II), and the constitutional unit (c) derived from at least one cyclic olefin represented by the above general formula (III), and having a content of the constitutional unit (a) of equal to or less than 50 mol % has a high refractive index, is unlikely to have a decrease in the refractive index even upon exposure to a high temperature environment for a long period of time, and is excellent in long-term reliability of optical performance.

That is, according to the present embodiment, it is possible to realize an optical component having a high refractive index and excellent long-term reliability of optical performance in a high temperature environment.

The lower limit of the content of the cyclic olefin-based copolymer (A) in the optical component according to the present embodiment is preferably equal to or more than 50% by mass, more preferably equal to or more than 70% by mass, still more preferably equal to or more than 80% by mass, even still more preferably equal to or more than 90% by mass, and particularly preferably equal to or more than 95% by mass in a case where the entire optical component is taken as 100% by mass. In a case where the content of the cyclic olefin-based copolymer (A) in the optical component according to the present embodiment is equal to or more than the above lower limit value, the optical performance can be further improved.

The upper limit of the content of the cyclic olefin-based copolymer (A) in the optical component according to the present embodiment is not particularly limited and is, for example, equal to or less than 100% by mass.

The optical component according to the present embodiment includes the cyclic olefin-based copolymer (A) and therefore has excellent optical performance. Therefore, the optical component according to the present embodiment can be suitably used as an optical component in an optical system that needs to identify an image with high accuracy. The optical component is a component used in optical system equipment or the like, and specific examples of the optical component include a sensor lens which is a lens used for various sensors, a pickup lens, a projector lens, a prism, an fθ lens, an image pickup lens, and a light guide plate. From the viewpoint of the effect according to the present embodiment, the optical component according to the present embodiment can be suitably used for an fθ lens, an image pickup lens, a sensor lens, a prism, or a light guide plate.

In particular, an optical component including the cyclic olefin-based copolymer (A) having a glass transition point in a range of equal to or higher than 140° C. satisfies moist heat resistance while having high heat resistance.

Therefore, the optical component including the cyclic olefin-based copolymer (A) having a glass transition point in a range of equal to or higher than 140° C. can be particularly suitably used for an optical component that requires heat resistance, such as an in-vehicle camera lens or a camera lens for a mobile device (a mobile phone, a smartphone, a tablet, or the like). Examples of the in-vehicle camera lens and the camera lens for a mobile device include a view camera lens, a sensing camera lens, a lens for light convergence of a head-up display, and a lens for light diffusion of a head-up display.

The optical component according to the present embodiment may be combined with a second optical component which is different from the above optical component.

The second optical component is not particularly limited, and for example, an optical component composed of at least one resin selected from a polycarbonate resin and a polyester resin can be used.

Hereinafter, each component will be specifically described.

(Cyclic Olefin-Based Copolymer (A))

The cyclic olefin-based copolymer (A) has the constitutional unit (a) derived from at least one olefin represented by the above general formula (I), the constitutional unit (b) derived from at least one cyclic olefin represented by the above general formula (II), and the constitutional unit (c) derived from at least one cyclic olefin represented by the above general formula (III).

<Constitutional Unit (a)>

In the above general formula (I), $R^{300}$ represents a hydrogen atom or a linear or branched hydrocarbon group having 1 to 29 carbon atoms. Examples of the olefin monomer for forming the constitutional unit (a) include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene. Among these olefin monomers, ethylene or propylene is preferable, and ethylene is particularly preferable, from the viewpoint of obtaining an optical component having better heat resistance, mechanical properties, and optical properties. As the olefin monomer for forming the constitutional unit (a), one type of olefin monomer may be used alone, or two or more types of olefin monomers may be used in combination.

In the cyclic olefin-based copolymer (A) according to the present embodiment, in a case where the total content of the constitutional unit (a), the constitutional unit (b), and the constitutional unit (c) is taken as 100 mol %, the content of the constitutional unit (a) is equal to or less than 50 mol %, preferably equal to or less than 49 mol %, and more preferably equal to or less than 48 mol %, and preferably equal to or more than 35 mol % and more preferably equal to or more than 40 mol %, from the viewpoint of improving the heat resistance of the optical component.

The content of the constitutional unit (a) can be measured by $^{13}$C-NMR.

<Constitutional Unit (b)>

In the above general formula (II), $R^1$ to $R^8$ are each independently a hydrogen atom, a halogen atom, or a hydrocarbon group having equal to or less than 4 carbon atoms. Here, the halogen atom is a fluorine atom, a chlorine atom, a bromine atom, or an iodine atom.

Examples of the hydrocarbon group having equal to or less than 4 carbon atoms include an alkyl group such as a methyl group, an ethyl group, a propyl group, an isopropyl group, an n-butyl group, or an isobutyl group, and a cycloalkyl group such as a cyclopropyl group.

In addition, $R^5$ to $R^8$ may be bonded to each other to form a monocyclic ring, the monocyclic ring may have a double bond, and $R^5$ and $R^6$ or $R^7$ and $R^8$ may form an alkylidene group.

The monocyclic rings formed here are exemplified below.

[Chem. 7]

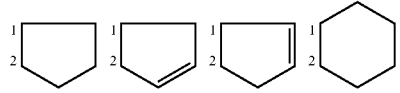

In the above monocyclic rings, the carbon atom numbered 1 or 2 is a carbon atom forming an alicyclic structure to which $R^5$ ($R^6$) or $R^7$ ($R^8$) is bonded in the general formula (II).

In addition, specific examples of the alkylidene group include an ethylidene group, a propylidene group, and an isopropylidene group.

Examples of the cyclic olefin monomer for forming the constitutional unit (b) include bicyclo[2.2.1]-2-heptene (also referred to as norbornene), a bicyclo[2.2.1]hept-2-ene derivative having equal to or less than 11 carbon atoms, a tricyclo[4.3.0.1$^{2,5}$]-3-decene derivative, and tricyclo [4.4.0.1$^{2,5}$]-3-undecene. Among these cyclic olefin monomers, bicyclo[2.2.1]-2-heptene is preferable.

As the cyclic olefin monomer for forming the constitutional unit (b), one type of cyclic olefin monomer may be used alone, or two or more types of cyclic olefin monomers may be used in combination.

In the cyclic olefin-based copolymer (A) according to the present embodiment, in a case where the total content of the constitutional unit (a), the constitutional unit (b), and the constitutional unit (c) is taken as 100 mol %, the content of the constitutional unit (b) is preferably equal to or more than 25 mol % and equal to or less than 64 mol %, more preferably equal to or more than 30 mol % and equal to or less than 60 mol %, still more preferably equal to or more than 35 mol % and equal to or less than 55 mol %, and particularly preferably equal to or more than 40 mol % and equal to or less than 55 mol %, from the viewpoint of improving the balance among long-term reliability of optical performance in a high temperature environment, refractive index, and heat resistance.

The content of the constitutional unit (b) can be measured by $^{13}$C-NMR.

<Constitutional Unit (c)>

In the above general formula (III), n is 0 or 1, m is 0 or a positive integer, n+m is a positive integer, and q is 0 or 1. In a case where q is 1, $R^a$ and $R^b$ each independently represent the following atom or hydrocarbon group, and in a case where q is 0, the respective bonding sites are bonded to each other to form a 5-membered ring.

In addition, in the above general formula (III), $R^1$ to $R^{18}$ and $R^a$ and $R^b$ are each independently a hydrogen atom, a halogen atom, or a hydrocarbon group. Here, the halogen atom is the same as the halogen atom in the above general formula (II).

In addition, examples of the hydrocarbon group include, usually, an alkyl group having 1 to 20 carbon atoms and a cycloalkyl group having 3 to 15 carbon atoms, respectively. More specifically, examples of the alkyl group include a methyl group, an ethyl group, a propyl group, an isopropyl group, an amyl group, a hexyl group, an octyl group, a decyl group, a dodecyl group, and an octadecyl group, and examples of the cycloalkyl group include a cyclohexyl group. These groups may be each substituted with a halogen atom.

Further, in the above general formula (III), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ each may be bonded to each other (or each may cooperate with each other) to form a monocyclic or polycyclic ring, and the monocyclic or polycyclic ring thus formed may have a double bond.

The monocyclic or polycyclic rings formed here are exemplified below.

[Chem. 8]

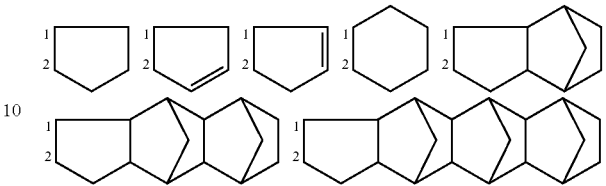

In the above exemplification, the carbon atom numbered 1 or 2 is a carbon atom forming an alicyclic structure to which $R^{15}$ ($R^{16}$) or $R^{17}$ ($R^{18}$) is bonded in the general formula (III).

In addition, $R^{15}$ and $R^{16}$ or $R^{17}$ and $R^{18}$ may form an alkylidene group. Examples of such an alkylidene group usually include an alkylidene group having 2 to 20 carbon atoms, specific examples of which include an ethylidene group, a propylidene group, and an isopropylidene group.

Examples of the cyclic olefin monomer for forming the constitutional unit (c) include tetracyclo[4.4.0.1$^{2,5}$.1$^{7,10}$]-3-dodecene (also referred to as tetracyclododecene), a tricyclo [4.3.0.1$^{2,5}$]-3-decene derivative having equal to or more than 12 carbon atoms, a tricyclo[4.3.0.1$^{2,5}$]-3-undecene derivative, a tetracyclo[4.4.0.1$^{2,5}$.1$^{7,10}$]-3-dodecene derivative, a pentacyclo[6.6.1.1$^{3,6}$.0$^{2,7}$.0$^{9,14}$]-4-hexadecene derivative, a pentacyclo[8.4.0.1$^{2,3}$.1$^{9,12}$.0$^{8,13}$]-3-hexadecene derivative, a pentacyclo[6.5.1.1$^{3,6}$.0$^{2,7}$.0$^{9,13}$]-4-pentadecene derivative, a pentacyclo[7.4.0.1$^{2,5}$.1$^{9,12}$.0$^{8,13}$]-3-pentadecene derivative, a pentacyclopentadecadiene derivative, a hexacyclo [6.6.1.1$^{3,6}$.1$^{10,13}$.0$^{2,7}$.0$^{9,14}$]-4-heptadecene derivative, a heptacyclo[8.7.0.1.3.6.1$^{10,17}$.1$^{12,15}$.0$^{2,7}$.0$^{11,16}$]-4-eicosene derivative, a heptacyclo-5-eicosene derivative, a heptacyclo [8.8.0.1$^{4,7}$.1$^{11,18}$.1$^{13,16}$.0$^{3,8}$.0$^{12,17}$]-5-heneicosene derivative, an octacyclo[8.8.0.1$^{2,9}$.1$^{4,7}$.1$^{11,18}$.1$^{13,16}$.0$^{3,8}$.0$^{12,17}$]-5-docosene derivative, a nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivative, and a nonacyclo[10.10.1.1$^{5,8}$.1$^{14,21}$.1$^{16,19}$.0$^{2,11}$.0$^{4,9}$.0$^{13,22}$.0$^{15,20}$]-5-hexacosene derivative.

Among these cyclic olefin monomers, tetracyclo[4.4.0.1$^{2,5}$.1$^{7,10}$]-3-dodecene is preferable.

As the cyclic olefin monomer for forming the constitutional unit (c), one type of cyclic olefin monomer may be used alone, or two or more types of cyclic olefin monomers may be used in combination.

In the cyclic olefin-based copolymer (A) according to the present embodiment, in a case where the total content of the constitutional unit (a), the constitutional unit (b), and the constitutional unit (c) is taken as 100 mol %, the content of the constitutional unit (c) is preferably equal to or more than 1 mol % and equal to or less than 25 mol % and more preferably equal to or more than 3 mol % and equal to or less than 20 mol %, from the viewpoint of facilitating the maintenance of a high refractive index of the optical component.

The content of the constitutional unit (c) can be measured by $^{13}$C-NMR.

In the cyclic olefin-based copolymer (A) according to the present embodiment, the ratio ((b)/(c)) of the content of the constitutional unit (b) to the content of the constitutional unit (c) is preferably equal to or more than 2 and more preferably equal to or more than 3. In a case where the (b)/(c) is equal to or more than the above lower limit value, it is possible to obtain an optical component having a higher refractive index and better long-term reliability of optical performance in a high temperature environment. In addition, the upper limit value of (b)/(c) is not particularly limited, and is preferably, for example, equal to or less than 13.

The cyclic olefin monomer for forming the constitutional unit (b) or the cyclic olefin monomer for forming the constitutional unit (c) is produced, for example, by a Diels-Alder reaction of cyclopentadiene and an olefin having a corresponding structure.

In addition, the cyclic olefin-based copolymer (A) according to the present embodiment may include a constitutional unit derived from another copolymerizable monomer, if necessary, as long as the object of the present invention is not impaired.

Examples of such another monomer include cyclic olefins other than the cyclic olefin monomer for forming the constitutional unit (b) and the cyclic olefin monomer for forming the constitutional unit (c), examples of which include cyclobutene, cyclopentene, cyclohexene, 3,4-dimethylcyclohexene, 3-methylcyclohexene, 2-(2-methylbutyl)-1-cyclohexene, and 3a,5,6,7a-tetrahydro-4,7-methano-1H-indene.

These cyclic olefins may be used alone or in combination. Further, other olefins such as styrene and α-methylstyrene are also mentioned.

It is preferable that the cyclic olefin-based copolymer (A) according to the present embodiment does not substantially include a gel-like crosslinked polymer and has a substantially linear structure which may have a branched structure. The fact that the copolymer has a substantially linear structure can be confirmed by the fact that the copolymer is dissolved in an organic solvent and then does not include an insoluble matter. For example, the fact that the copolymer has a substantially linear structure can be confirmed by the copolymer being completely dissolved in decalin at 135° C. in a case where the limiting viscosity [η] of the copolymer is measured as described later.

In addition, the limiting viscosity ([η]) of the cyclic olefin-based copolymer (A) according to the present embodiment measured in decalin at 135° C. is preferably 0.1 to 2.0 dl/g and more preferably 0.15 to 1.7 dl/g. In a case where the cyclic olefin-based copolymer (A) according to the present embodiment has the above-mentioned limiting viscosity ([η]), the mechanical strength does not decrease and the moldability is excellent, and the effect on melt fluidity due to increase in molecular weight is small.

The copolymerization type of the cyclic olefin-based copolymer (A) according to the present embodiment is not particularly limited, and examples of the copolymerization type include a random copolymer and a block copolymer. In the present embodiment, it is preferable to use a random copolymer as the cyclic olefin-based copolymer (A) according to the present embodiment, from the viewpoint of being able to obtain a highly accurate optical component whose optical properties such as transparency, refractive index, and birefringence index are excellent.

In the cyclic olefin-based copolymer (A) according to the present embodiment, it is preferable that the constitutional unit (b) in the cyclic olefin-based copolymer (A) includes a repeating unit derived from bicyclo[2.2.1]-2-heptene, and the constitutional unit (c) in the cyclic olefin-based copolymer (A) includes a repeating unit derived from tetracyclo[4.4.0.1$^{2,5}$.1$^{7,10}$]-3-dodecene.

The cyclic olefin-based copolymer (A) according to the present embodiment is preferably a random copolymer of ethylene, bicyclo[2.2.1]-2-heptene, and tetracyclo[4.4.0.1$^{2,5}$.1$^{7,10}$]-3-dodecene.

In the present embodiment, one type of the cyclic olefin-based copolymer (A) may be used alone, or two or more types of the cyclic olefin-based copolymer (A) may be used in combination.

The cyclic olefin-based copolymer (A) according to the present embodiment can be produced, for example, by appropriately selecting conditions according to the methods of Japanese Unexamined Patent Publication No. 60-168708, Japanese Unexamined Patent Publication No. 61-120816, Japanese Unexamined Patent Publication No. 61-115912, Japanese Unexamined Patent Publication No. 61-115916, Japanese Unexamined Patent Publication No. 61-271308, Japanese Unexamined Patent Publication No. 61-272216, Japanese Unexamined Patent Publication No. 62-252406, Japanese Unexamined Patent Publication No. 62-252407, and the like.

The glass transition point (Tg) of the cyclic olefin-based copolymer (A) according to the present embodiment is preferably equal to or higher than 140° C., more preferably equal to or higher than 143° C., still more preferably equal to or higher than 145° C., and even still more preferably equal to or higher than 150° C. In a case where the glass transition point (Tg) of the cyclic olefin-based copolymer (A) is within the above range, even better heat resistance can be obtained in a case of being used as an optical component that requires heat resistance, such as an in-vehicle camera lens or a camera lens for a mobile device. The upper limit of the glass transition point (Tg) of the cyclic olefin-based copolymer (A) according to the present embodiment is not particularly limited, and is preferably equal to or lower than 180° C. and more preferably equal to or lower than 170° C. from the viewpoint of moldability.

The glass transition point (Tg) of the cyclic olefin-based copolymer (A) according to the present embodiment can be measured using a differential scanning calorimeter (DSC).

(Other Components)

The optical component according to the present embodiment may include a known additive as an optional component in addition to the cyclic olefin-based copolymer (A), as long as it does not impair the good physical properties of the optical component according to the present embodiment.

Examples of the additive include a hydrophilic stabilizer, a hydrophilizing agent, an antioxidant, a secondary antioxidative agent, a lubricant, a mold release agent, an antifogging agent, a weathering stabilizer, a light stabilizer, a UV absorber, an antistatic agent, a metal deactivating agent, a phenol-based stabilizer, a higher fatty acid metal salt, a hindered amine-based light stabilizer, a hydrochloric acid absorber, a slip agent, a nucleating agent, a plasticizer, a flame retardant, and a phosphorus-based stabilizer.

It is more preferable to include a hydrophilic stabilizer because deterioration of optical performance under high temperature and high humidity conditions can be suppressed.

The hydrophilic stabilizer is preferably a fatty acid ester of a fatty acid and a polyhydric alcohol. The hydrophilic stabilizer is more preferably a fatty acid ester of a fatty acid and a polyhydric alcohol having equal to or more than 1 ether group.

[Method for Producing Optical Component]

The optical component according to the present embodiment can be produced by molding a cyclic olefin-based resin composition including the cyclic olefin-based copolymer (A) into a predetermined shape.

The method for obtaining the optical component by molding the cyclic olefin-based resin composition is not particularly limited, and a known method can be used. For example, extrusion molding, injection molding, inflation molding, blow molding, extrusion blow molding, injection blow molding, press molding, vacuum molding, powder slush molding, calendar molding, or foam molding can be applied depending on the application and shape of the optical component. Among these molding methods, the injection molding method is preferable from the viewpoint of moldability and productivity. In addition, the molding conditions are appropriately selected depending on the purpose of use or the molding method. For example, the resin temperature in injection molding is appropriately selected in a range of usually 150° C. to 400° C., preferably 200° C. to 350° C., and more preferably 230° C. to 330° C.

The cyclic olefin-based resin composition according to the present embodiment can be obtained by, for example, a method in which the cyclic olefin-based copolymer (A) and other components added as needed are melt-kneaded using a known kneading device such as an extruder or a Banbury mixer; a method in which the cyclic olefin-based copolymer (A) and other components added as needed are dissolved in a common solvent, and then the solvent is evaporated; or a method in which a solution of the cyclic olefin-based copolymer (A) and other components added as needed is added to a poor solvent to cause precipitation.

Although the embodiments of the present invention have been described hereinbefore, those embodiments are only illustrative for the present invention and various configurations other than the foregoing configurations can be adopted.

In addition, it should be noted that the present invention is not limited to the foregoing embodiments, and modifications, improvements, and the like to the extent that the object of the present invention can be achieved are included in the present invention.

EXAMPLES

Hereinafter, the present invention will be described in more detail with reference to Examples, but the present invention is not limited thereto.
<Production of Cyclic Olefin-Based Copolymer>

Production Example 1

Nitrogen was flowed as an inert gas at a flow rate of 100 Nl/hr for 30 minutes in a glass reaction vessel having a volume of 500 ml equipped with a stirrer, and then cyclohexane, tetracyclo[4.4.0.1$^{2,5}$.1$^{7,10}$]-3-dodecene (10 mmol, hereinafter also referred to as tetracyclododecene (denoted as TD in Table 1)), and 2-norbornene (45 mmol, denoted as NB in Table 1) were added. Then, the solvent temperature was raised to 50° C. while stirring the polymerization solvent at a rotation speed of 600 rpm. After the solvent temperature reached a predetermined temperature, the flowing gas was switched from nitrogen to ethylene. Ethylene at a supply rate of 50 Nl/hr and hydrogen at a supply rate of 0.2 Nl/hr were flowed in the reaction vessel. After 10 minutes, methylaluminoxane (MMAO) (0.9 mmol) and a catalyst (0.003 mmol) in which titanium in the transition metal compound (1) described in paragraphs [0158] and [0159] of WO2017/150218 was changed to zirconium were added to the glass reaction vessel to initiate polymerization. The catalyst was synthesized by the method described in Japanese Unexamined Patent Publication No. 2004-331965.

After 30 minutes, 5 ml of isobutyl alcohol was added to terminate the polymerization to obtain a polymerization solution including a copolymer of ethylene, tetracyclododecene, and norbornene. Then, the polymerization solution was transferred to a separately prepared beaker having a volume of 2 L to which 5 ml of concentrated hydrochloric acid and a stirrer were then added, followed by contact of the components for 2 hours under vigorous stirring to carry out a decalcification operation. The decalcified polymerization solution was added to a beaker including about 4 times the volume of acetone with respect to the polymerization solution under stirring to precipitate a copolymer, and the precipitated copolymer was separated from the filtrate by filtration. In a case where the obtained polymer including the solvent was dried under reduced pressure at 130° C. for 10 hours, 2.72 g of a white powdery ethylene/tetracyclododecene/norbornene copolymer was obtained.

In this manner, a cyclic olefin-based copolymer (P-1) was obtained.

Production Examples 2 to 8

Cyclic olefin-based copolymers (P-2) to (P-8) shown in Table 1 were obtained in the same manner as in Production Example 1, except that the content value of each constitutional unit constituting the cyclic olefin-based copolymer was adjusted to be the value shown in Table 1.

[Method for Measuring Content of Each Constitutional Unit Constituting Cyclic Olefin-Based Copolymer]

The contents of the constitutional unit (a) derived from ethylene, the constitutional unit (b) derived from norbornene, and the constitutional unit (c) derived from tetracyclododecene were measured under the following conditions using a nuclear magnetic resonance apparatus "ECA500" (manufactured by JEOL Ltd.).

Solvent: heavy tetrachloroethane
Sample concentration: 50 to 100 g/l-solvent
Pulse repetition time: 5.5 seconds
Cumulated number: 6,000 to 16,000 times
Measurement temperature: 120° C.

Based on the $^{13}$C-NMR spectrum measured under the above conditions, the content of each of the ethylene-derived constitutional unit (a), the norbornene-derived constitutional unit (b), and the tetracyclododecene-derived constitutional unit (c) constituting the cyclic olefin-based copolymer was quantified.

[Glass Transition Point (Tg)]

The glass transition point (Tg) of the cyclic olefin-based copolymer was measured in an $N_2$ (nitrogen) atmosphere using DSC-6220 (manufactured by Shimadzu Science Co., Ltd.). The cyclic olefin-based copolymer was heated from room temperature to 200° C. at a rate of temperature increase of 10° C./min and then held for 5 minutes, and then cooled to −20° C. at a rate of temperature decrease of 10° C./min and then held for 5 minutes. Then, the glass transition point (Tg) of the cyclic olefin-based copolymer was obtained from the endothermic curve in a case where the temperature was raised to 200° C. at a rate of temperature increase of 10° C./min.

[Limiting Viscosity [η]]

Using a mobile viscometer (manufactured by Rigo Co., Ltd., Type VNR053U Model), 0.25 to 0.30 g of the cyclic olefin-based copolymer was dissolved in 25 ml of decalin as a sample. The specific viscosity of the cyclic olefin-based copolymer was measured at 135° C. according to ASTM J1601, and the ratio of the measured specific viscosity to the concentration was extrapolated to a concentration of 0 to determine the limiting viscosity [η] of the cyclic olefin-based copolymer.

Example 1

Using an injection molding machine (ROBOSHOT α-S30iA, manufactured by FANUC Corporation), the cyclic olefin-based resin (P-1) was injection molded under the conditions of a cylinder temperature of 275° C. and a mold temperature of 125° C. to prepare an injection molded sheet having a thickness of 65 mm×35 mm×thickness 3 mm.

Each of the following evaluations was carried out on the obtained injection molded sheet. The results obtained are shown in Table 1.

(1) Refractive Index

Using a refractometer (KPR200, manufactured by Shimadzu Science Co., Ltd.), the refractive index (nd) of an injection molded sheet of 30 mm×30 mm×thickness 2.0 mm molded with a microcompounder at a wavelength of 589 nm was measured according to ASTM D542. Here, the refractive index (nd) of the injection molded sheet at a wavelength of 589 nm was measured before and after the heat resistance test below.

(2) Heat Resistance Test

The obtained injection molded sheet was left at a temperature of 139° C. and in an atmospheric atmosphere for 168 hours. Then, 3 hours after taking out the injection molded sheet, the refractive index (nd) at a wavelength of 589 nm was measured to determine the change in the refractive index before and after the heat resistance test.

(3) Internal Haze

The internal haze of the obtained injection molded sheet was measured using benzyl alcohol and using Haze Meter HM-150 (manufactured by Murakami Color Research Laboratory Co., Ltd.) based on JIS K-7136 (HAZE). Then, the internal haze was evaluated according to the following criteria.

○: The internal haze is less than 5%
X: The internal haze is equal to or more than 5%

Examples 2 to 8 and Comparative Examples 1 to 4

Injection molded sheets were prepared in the same manner as in Example 1, except that the type of the cyclic olefin-based copolymer was changed to the polymer shown in Table 1, and then evaluated in the same manner as in Example 1, except that the heat resistance test temperature in the heat resistance test was set to the temperature shown in Table 1. The obtained results are shown in Table 1.

TABLE 1

| | Example 1 | Example 2 | Example 3 | Example 4 | Example 5 | Example 6 | Example 7 |
|---|---|---|---|---|---|---|---|
| Cyclic olefin-based copolymer | P-1 | P-1 | P-2 | P-2 | P-3 | P-3 | P-4 |
| Constitutional unit (a) (mol %) derived from ethylene | 42 | 42 | 45 | 45 | 48 | 48 | 49 |
| Constitutional unit (b) (mol %) derived from NB | 53 | 53 | 46 | 46 | 40 | 40 | 47 |
| Constitutional unit (c) (mol %) derived from TD | 5 | 5 | 9 | 9 | 12 | 12 | 4 |
| Content of constitutional unit (b)/content of constitutional unit (c) | 11.4 | 11.4 | 5.0 | 5.0 | 3.3 | 3.3 | 11.2 |
| Glass transition point Tg (° C.) | 159 | 159 | 159 | 159 | 159 | 159 | 148 |
| Heat resistance test temperature (° C.) | 139 | 125 | 139 | 125 | 139 | 125 | 128 |
| [η] (dl/g) | 0.45 | 0.45 | 0.63 | 0.63 | 0.55 | 0.55 | 0.53 |
| Refractive index (nd) before heat resistance test | 1.5349 | 1.5349 | 1.5335 | 1.5335 | 1.5346 | 1.5346 | 1.5326 |
| Refractive index (nd) after heat resistance test | 1.5366 | 1.5358 | 1.5355 | 1.5348 | 1.5367 | 1.5361 | 1.5347 |
| Change in refractive index (Δnd = refractive index (after test) − refractive index (before test)) | 0.0017 | 0.0009 | 0.0020 | 0.0013 | 0.0021 | 0.0015 | 0.0021 |
| Internal haze | ○ | ○ | ○ | ○ | ○ | ○ | ○ |

| | Example 8 | Comparative Example 1 | Comparative Example 2 | Comparative Example 3 | Comparative Example 4 |
|---|---|---|---|---|---|
| Cyclic olefin-based copolymer | P-4 | P-5 | P-6 | P-7 | P-8 |
| Constitutional unit (a) (mol %) derived from ethylene | 49 | 63 | 43 | 53 | 51 |
| Constitutional unit (b) (mol %) derived from NB | 47 | 0 | 57 | 25 | 33 |

TABLE 1-continued

|  | | | | | |
|---|---|---|---|---|---|
| Constitutional unit (c) (mol %) derived from TD | 4 | 37 | 0 | 23 | 16 |
| Content of constitutional unit (b)/content of constitutional unit (c) | 11.2 | — | — | 1.1 | 2.2 |
| Glass transition point Tg (° C.) | 148 | 140 | 133 | 142 | 141 |
| Heat resistance test temperature (° C.) | 125 | 125 | 113 | 125 | 125 |
| [η] (dl/g) | 0.53 | 0.43 | 0.52 | 0.39 | 0.33 |
| Refractive index (nd) before heat resistance test | 1.5326 | 1.5432 | 1.5319 | 1.5385 | 1.5364 |
| Refractive index (nd) after heat resistance test | 1.5345 | 1.5464 | 1.5332 | 1.5413 | 1.5390 |
| Change in refractive index (Δnd = refractive index (after test) − refractive index (before test)) | 0.0019 | 0.0032 | 0.0013 | 0.0028 | 0.0026 |
| Internal haze | ○ | ○ | ○ | ○ | ○ |

This application claims priority based on Japanese Patent Application No. 2020-008687 filed on Jan. 22, 2020, the disclosure of which is herein incorporated by reference in its entirety.

The invention claimed is:

1. An optical component comprising:

a cyclic olefin-based copolymer (A), wherein the cyclic olefin-based copolymer (A) has a constitutional unit (a) derived from at least one olefin represented by the following general formula (I), a constitutional unit (b) derived from at least one cyclic olefin represented by the following general formula (II), and a constitutional unit (c) derived from at least one cyclic olefin represented by the following general formula (III), and a content of the constitutional unit (a) is equal to or less than 50 mol % in a case where a total content of the constitutional unit (a), the constitutional unit (b), and the constitutional unit (c) is taken as 100 mol %, and wherein a glass transition point (Tg) of the cyclic olefin-based copolymer (A) measured by DSC is equal to or higher than 140° C.,

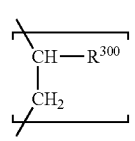

in the general formula (I), $R^{300}$ represents a hydrogen atom or a linear or branched hydrocarbon group having 1 to 29 carbon atoms

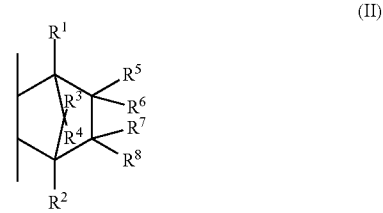

in the general formula (II), $R^1$ to $R^8$ are each independently a hydrogen atom, a halogen atom, or a hydrocarbon group having equal to or less than 4 carbon atoms, $R^5$ to $R^8$ may be bonded to each other to form a monocyclic ring, the monocyclic ring may have a double bond, and $R^5$ and $R^6$ or $R^7$ and $R^8$ may form an alkylidene group

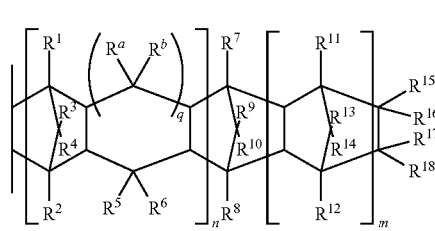

in the general formula (III), n is 0 or 1, m is 0 or a positive integer, n+m is a positive integer, q is 0 or 1, $R^1$ to $R^{18}$ and $R^a$ and $R^b$ are each independently a hydrogen atom, a halogen atom, or a hydrocarbon group, $R^{15}$ to $R^{18}$ may be bonded to each other to form a monocyclic or polycyclic ring, the monocyclic or polycyclic ring may have a double bond, and $R^{15}$ and $R^{16}$ or $R^{17}$ and $R^{18}$ may form an alkylidene group.

2. The optical component according to claim 1, wherein a ratio ((b)/(c)) of a content of the constitutional unit (b) to a content of the constitutional unit (c) in the cyclic olefin-based copolymer (A) is equal to or more than 2.

3. The optical component according to claim 1,
wherein the constitutional unit (b) in the cyclic olefin-based copolymer (A) includes a repeating unit derived from bicyclo[2.2.1]-2-heptene, and the constitutional unit (c) in the cyclic olefin-based copolymer (A) includes a repeating unit derived from tetracyclo[$4.4.0.1^{2,5}.1^{7,10}$]-3-dodecene.

4. The optical component according to claim 1,
wherein the constitutional unit (a) in the cyclic olefin-based copolymer (A) includes a repeating unit derived from ethylene.

5. The optical component according to claim 1,
wherein the optical component is an fθ lens, an image pickup lens, a sensor lens, a prism, or a light guide plate.

6. The optical component according to claim 1,
wherein the optical component is an in-vehicle camera lens or a camera lens for a mobile device.

\* \* \* \* \*